(12) United States Patent
Wolfgang et al.

(10) Patent No.: US 11,913,579 B2
(45) Date of Patent: Feb. 27, 2024

(54) CONVEYING DEVICE FOR USE IN THE FIELD OF PLASTICS

(71) Applicant: Motan Holding GmbH, Constance (DE)

(72) Inventors: Karl-Martin Wolfgang, Leutkirch (DE); Tobias Engel, Isny (DE)

(73) Assignee: Motan Holding GmbH, Constance (DE)

( * ) Notice: Subject to any disclaimer, the term of this patent is extended or adjusted under 35 U.S.C. 154(b) by 704 days.

(21) Appl. No.: 17/065,542

(22) Filed: Oct. 8, 2020

(65) Prior Publication Data
US 2021/0108749 A1  Apr. 15, 2021

(30) Foreign Application Priority Data

Oct. 11, 2019 (DE) ..................... 10 2019 007 134.4
Jul. 17, 2020 (DE) ..................... 10 2020 004 386.0

(51) Int. Cl.
*F16L 37/092* (2006.01)
*G01G 13/02* (2006.01)

(52) U.S. Cl.
CPC ........ *F16L 37/0925* (2013.01); *G01G 13/028* (2013.01)

(58) Field of Classification Search
CPC ... F16L 37/0925; G01G 13/02; G01G 13/028; B65G 53/04; B65G 53/60
USPC .......................................................... 209/1
See application file for complete search history.

(56) References Cited

U.S. PATENT DOCUMENTS

| 10,508,761 B2 * | 12/2019 | Wolfgang ............... F16L 33/22 |
| 2005/0079018 A1 * | 4/2005 | Volkmann ............. G01G 11/003 |
| | | 406/168 |
| 2017/0321682 A1 * | 11/2017 | Kang ................... F04B 39/0072 |
| 2021/0108749 A1 * | 4/2021 | Wolfgang ............. G01G 13/028 |

FOREIGN PATENT DOCUMENTS

| DE | 102005029061 A1 * | 1/2007 | ............ F16L 21/022 |
| DE | 102008014255 B3 * | 1/2009 | .......... F16L 37/0985 |
| EP | 1505016 A1 * | 2/2005 | ............. B65G 53/60 |
| EP | 3293131 A1 * | 3/2018 | ............. B65G 53/24 |

* cited by examiner

*Primary Examiner* — Terrell H Matthews
(74) *Attorney, Agent, or Firm* — Gudrun E Huckett (57) ABSTRACT

A conveying device for use in the field of plastics has a frame and a weighing cell connected to the frame. A separating unit is suspended from the weighing cell. A first coupling is connected to the frame and connects a vacuum source to the separating unit. A second coupling is connected to the frame and connects a conveying line for goods to be conveyed to the separating unit. At least one of the first coupling and the second coupling has a first coupling part connected to the separating unit and a second coupling part connected to the frame, wherein the first and the second coupling parts do not contact each other in a region of no contact. At least one sealing element is provided to seal the region of no contact between the first and the second coupling parts.

18 Claims, 8 Drawing Sheets

CONVEYING DEVICE FOR USE IN THE FIELD OF PLASTICS

BACKGROUND OF THE INVENTION

The invention relates to a conveying device for use in the field of plastics. The conveying device comprises a separating unit suspended from a weighing cell that is held at a frame, wherein the frame is connected by a first coupling, providing a connection to at least one vacuum line, and by a second coupling, providing a connection to at least one conveying line for goods to be conveyed, to the separating unit.

The conveying device enables a gravimetric throughput logging of goods to be conveyed, which may be granules, powder, ground material, flakes and the like. The conveying device weighs by means of a weighing cell each charge of the material before it exits the conveying device and is supplied, for example, to a processing machine or a drying hopper. The weighing cell is fastened to a frame; couplings for a vacuum line and a conveying or material line are secured also to the frame. The couplings connect the separating unit with the frame. During the conveying process, forces are acting on the vacuum line as well as on the conveying line and these forces are transmitted to the separating unit and affect the weighing result.

It is the object of the invention to configure the conveying device of the aforementioned kind such that in a constructively simple manner the weighing result is not affected, or only affected to a negligible minimal extent, by the conveying process.

SUMMARY OF THE INVENTION

This object is solved for the conveying device of the aforementioned kind in accordance with the invention in that at least the first and/or the second coupling comprises a coupling part connected to the separating unit and comprises a coupling part connected to the frame, wherein the two coupling parts do not contact each other, and wherein the region between the two coupling parts can be sealed by at least one sealing element.

In the conveying device according to the invention, the first and/or the second coupling is configured such that the coupling part connected to the frame and the coupling part connected to the separating unit do not contact each other. The coupling parts can thus be formed by shape-stable parts such as pipe pieces which can be fastened in a simple and reliable way to the separating unit and to the frame, respectively. Since the coupling parts are not in contact with each other, when the conveying device is filled with the goods to be conveyed during the conveying process, no forces which could act through the vacuum line or through the conveying line are exerted on the separating unit.

Since the two coupling parts have no contact with each other, an open region is formed between the two coupling parts which can be sealed by the sealing element. Therefore, a reliable conveyance of the goods into the conveying device is ensured.

The two coupling parts can adjoin each other in an advantageous manner without contact. This is to be understood such that the two coupling parts are designed such that, viewed transverse to their axis, they adjoin each other or overlap each other.

The coupling parts are preferably cylindrical pipe pieces that are inexpensive components and ensure a reliable conveyance of the goods.

In order to ensure a reliable conveyance, the two coupling parts of the couplings are advantageously aligned with each other.

The two coupling parts of at least one of the couplings, preferably of both couplings, can be designed and arranged such that they are spaced at an axial distance from each other. In this case, the distance between the coupling parts is bridged by a bushing that is provided on at least of the one coupling parts in order to enable conveyance.

The sealing element is a flat sealing ring in a preferred embodiment. It occupies only a little space and provides still a reliable sealing action.

The sealing element is comprised advantageously of a soft material so that the sealing element for ensuring a reliable sealing action can be easily moved or elastically deformed in its mounted position.

As a preferred material, a soft plastic material is suitable that has a Shore A hardness of approximately 25 to 40. Such a sealing element, on the one hand, has a sufficient shape stability; on the other hand, it is sufficiently movable in order to fulfill its sealing function.

As a preferred plastic material, EPDM (ethylene propylene diene monomer rubber) with a Shore A hardness of approximately 25 to 40 is suitable.

In order to secure the sealing element reliably at the conveying device, the sealing element engages in an advantageous manner with its radial inner rim an annular groove of the coupling part which is correlated with the separating container or the frame. The sealing element can be held easily and reliably in the annular groove.

The annular groove is advantageously provided at the outer side of a bushing that is fastened to the respective coupling part. The bushing can have a sufficiently large wall thickness in order to provide the annular groove for the sealing element.

In order for the sealing element to have sufficient freedom of movement for fulfilling its sealing function, the sealing element is mounted in such a way at the respective coupling part that it projects with more than half of its radial width from the annular groove. This projecting part of the sealing element enables the required movability of the sealing element that is needed for the sealing function.

The sealing element is installed such that it is positioned in a radial plane of the respective coupling part so that the sealing element, despite its flat annular configuration, requires only little installation space.

In an advantageous embodiment, the sealing element is installed such that it is spaced apart from a sealing surface in a release or rest position. In this rest position, the interior of the respective coupling is connected by a corresponding gap to the environment. As long as no conveying process is taking place, sealing of the couplings relative to the environment is not required.

As soon as a conveying process is started, the sealing element is suddenly adjusted, due to the vacuum acting in the couplings as a result of the suction action, from its release or rest position into its sealing position in which it is seal-tightly contacting the respective sealing surface. Due to the vacuum conveying action, an axial force is acting on the part of the sealing element projecting from the annular groove, and the axial force causes the sealing element to be adjusted from the release or rest position into the sealing position.

In the release or rest position, the sealing element is spaced apart from the sealing surface at a distance. In this way, between the sealing element and the sealing surface a passage is formed that connects the interior of the coupling to the environment. When the vacuum conveying action is started, an air flow is produced via this passage from the environment into the couplings so that it is advantageously achieved that contaminants or particles of the goods to be conveyed that are possibly present in the region of this passage are sucked away.

As soon as the conveying process is terminated and the vacuum source is switched off, the sealing element automatically returns on its own from the sealing position into the release or rest position.

The sealing element can also be designed as a conical disc-shaped ring which in an advantageous manner is provided on a securing ring which is seated on one of the coupling parts. The conical disc-shaped sealing element is contacting seal-tightly a sealing surface of a bushing which is seated on the other coupling part and projects axially past this coupling part.

The conical disc-shaped sealing element is comprised advantageously of a soft plastic material, of EPDM or another elastic sealing material with a Shore A hardness of only approximately 25 to 40.

The subject matter of the application results not only from the subject matter of the individual claims but also from the specifications and features disclosed in the drawings and in the description. These specifications and features are considered as important to the invention even if they are not subject matter of the claims in as much as, individually or in combination, they are novel relative to the prior art.

Further features of the invention result from the further claims, the description, and the drawings.

BRIEF DESCRIPTION OF THE DRAWING

The invention will be explained in more detail with the aid of an embodiment illustrated in the drawings.

DESCRIPTION OF PREFERRED EMBODIMENTS

The conveying device serves to supply from a storage container (not illustrated), such as a silo and the like, bulk material in a weighed quantity to a processing machine (not illustrated). Bulk material is to be understood as materials which by means of a suction (vacuum) conveying action can be transported away from the storage container. In general, such bulk material is in the form of granules. Bulk material can also be in the form of powder, ground material, flakes and the like. Advantageously, the bulk material is comprised of plastic material which is processed in the processing machine to a respective product, for example, plastic pipes, plastic containers, and the like.

The conveying device comprises a separating unit 1 which is embodied as is known in the art and therefore will be explained only briefly herein.

The separating unit 1 is suspended from a weighing cell 2 which is held at a frame 3.

The separating unit 1 comprises a housing 4 which is advantageously comprised of housing parts 4a to 4d that are stacked on each other.

The upper housing part 4a comprises a coupling connector 5a which is a coupling part of a coupling 5. By means of the coupling 5, the separating unit 1 is connected to a suction unit (not illustrated).

The coupling connector 5a is a pipe socket which is projecting radially away from the housing part 4a and has correlated therewith a coupling connector 5b as a coupling part that is held at the frame 3 (see FIG. 3) and is in the form of a pipe socket. The coupling connector 5b is spaced apart at an axial distance from the coupling connector 5a. Both coupling connectors 5a, 5b have preferably the same inner diameter, advantageously also the same outer diameter, and are aligned with each other in axial direction.

The two coupling connectors 5a, 5b form the coupling 5. The coupling connector 5b projects through an opening 6 in the frame 3. To the end of the coupling connector 5b which is projecting through the opening 6, a vacuum valve 7 with implosion cleaning action is connected and the suction source is connected by means of a corresponding suction hose to the vacuum valve 7.

At the end of the coupling connector 5b which is facing the coupling connector 5a, a bushing 13 is seated which is projecting axially in the direction toward the coupling connector 5a past the coupling connector 5b. The bushing 13 is sealed by at least one sealing ring 14 against the coupling connector 5b, in the embodiment by two sealing rings 14 which are positioned axially spaced apart one behind the other. The two sealing rings 14 are positioned each in an annular groove 15 at the inner side of the bushing 13.

The bushing 13 comprises a flat end face 16 that is facing a bushing 10 and is positioned opposite a sealing element 9 at a minimal axial spacing.

The projecting end region 8 of the bushing 13 is embodied at the inner side with a conical shape which widens in the direction toward the coupling connector 5a. The conical inner wall 13a extends advantageously to the level of the end face of the coupling connector 5a. A cylindrical inner wall 13b adjoins the conical inner wall 13a and surrounds the free end of the coupling connector at a radial distance. In this way, an annular gap 17 that connects the environment to the interior of the coupling 5 is formed between the two coupling connectors 5a, 5b.

The bushing 10 is seated on the coupling connector 5a and is held in a suitable way on the coupling connector 5a. For sealing the bushing 10 on the coupling connector 5a, at least one sealing ring 11 is provided which is arranged in an annular groove 12 at the inner side of the bushing 10. In the illustrated embodiment, the bushing 10 has two annular grooves 12 arranged one behind the other at an axial distance in which a respective sealing ring 11 is accommodated. In the mounted position, the sealing rings 11 are elastically deformed and seal thereby the bushing 10 relative to the coupling connector 5a.

Figure 3:
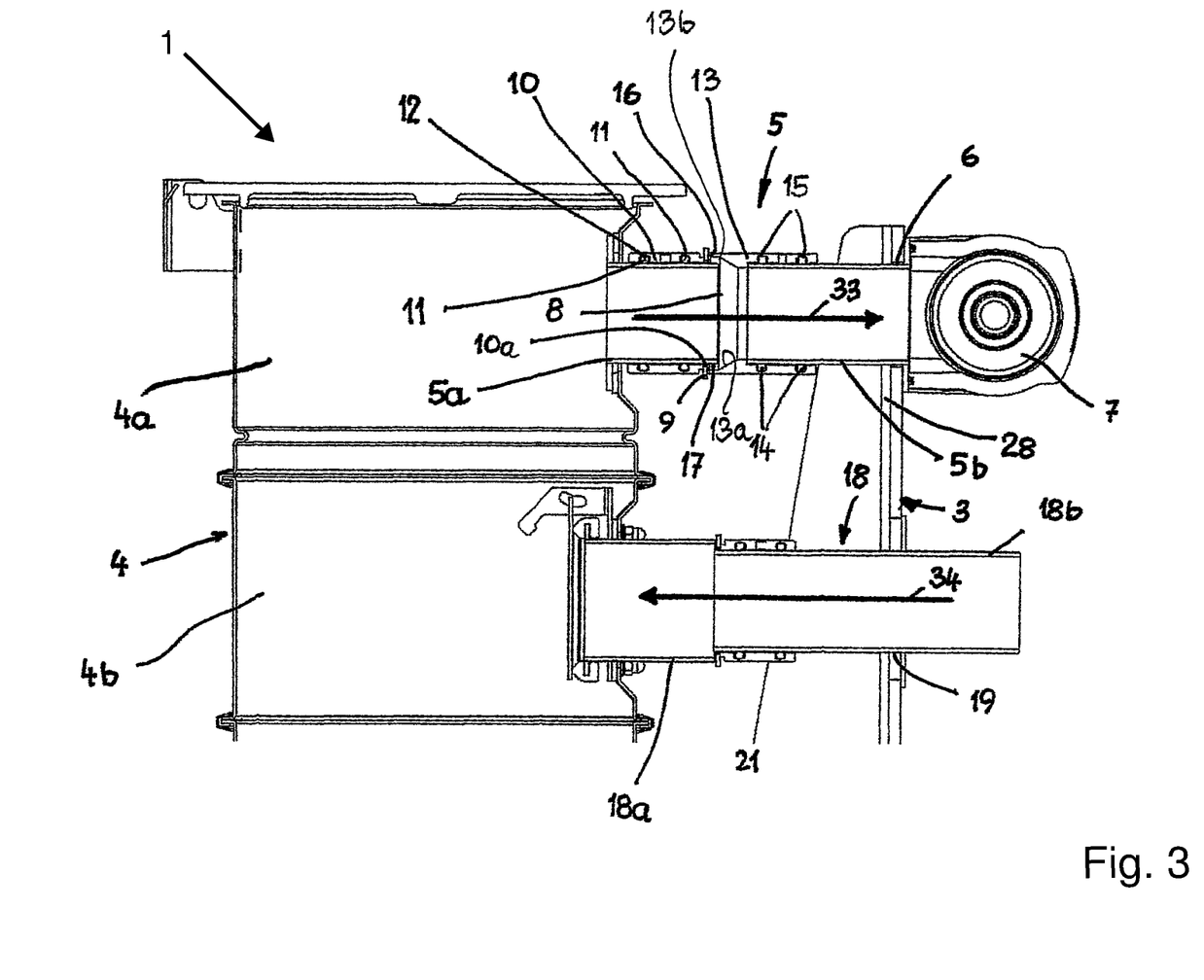
FIG. 3 shows in enlarged illustration the upper part of the conveying device according to the invention with the course of the air flow during the filling process.

Near the coupling connector 5b, the bushing 10 is provided at its outer side with an annular groove 10a which is engaged by the annular disk-shaped sealing element 9 that is embodied as a thin sealing ring and is comprised of a soft plastic material, preferably EPDM. The sealing element 9 has a Shore A hardness of only approximately 25 to 40, for example. Advantageously, the sealing element 9 has a rectangular cross-section (FIG. 3).

The sealing element 9 projects with most of its radial width from the annular groove 10a which is provided in an end section of the bushing 10 with a reduced outer diameter.

The housing part 4b has a coupling connector 18a which projects radially away from the housing part 4b. The coupling connector 18a is a coupling part of a coupling 18 by means of which the separating unit 1 can be connected to the storage container for conveyance of goods to be conveyed stored in the storage container.

The coupling 18 comprises the additional coupling connector 18b which projects through an opening 19 in the frame 3 and is fastened to the frame 3. To the projecting end of the coupling connector 18b, the corresponding conveying line is connected by means of which the goods to be conveyed are conveyed from the storage container to the separating unit 1.

Figure 4:
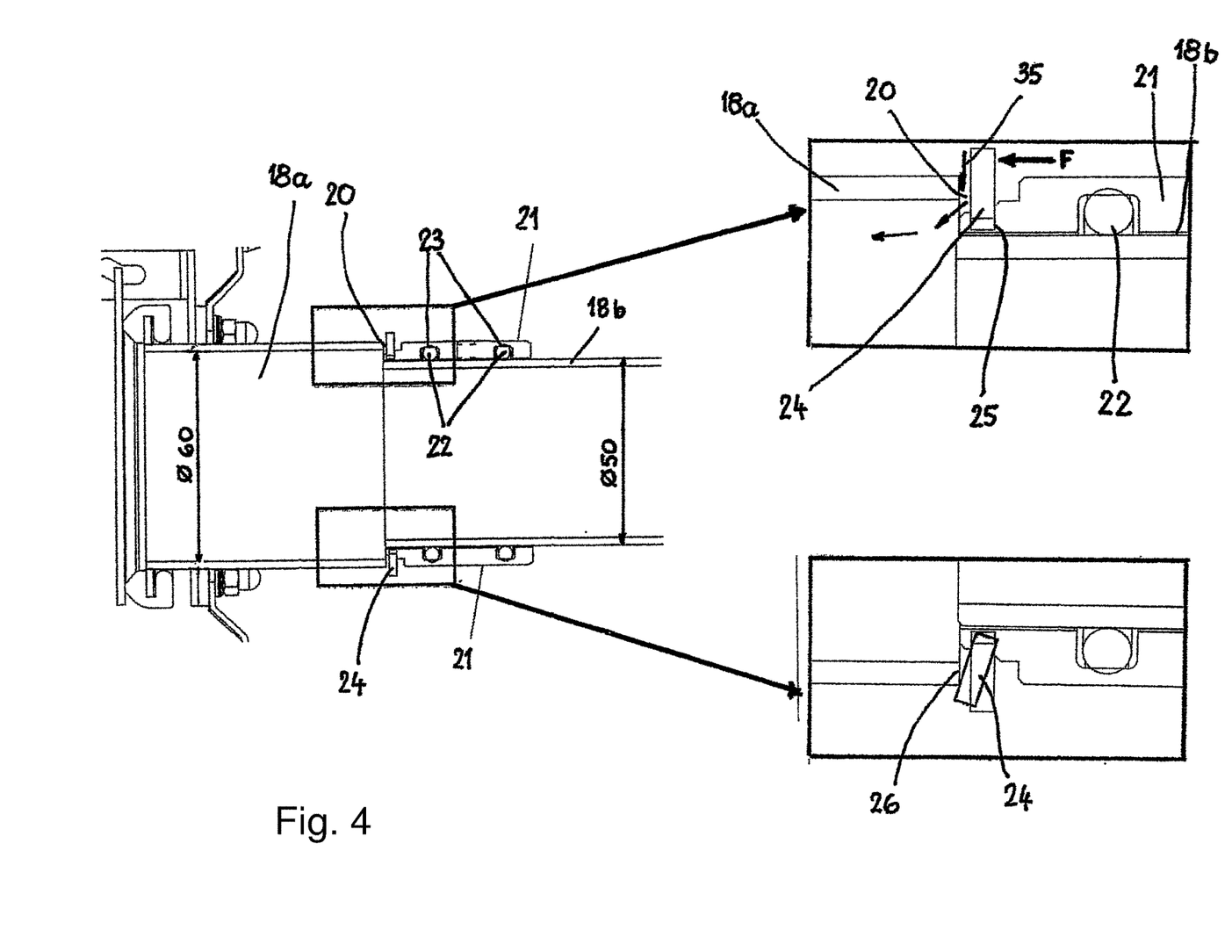
FIG. 4 shows in enlarged illustration a coupling of the conveying device according to the invention with a sealing element in a release or rest position and in a sealing position.
Figure 5:
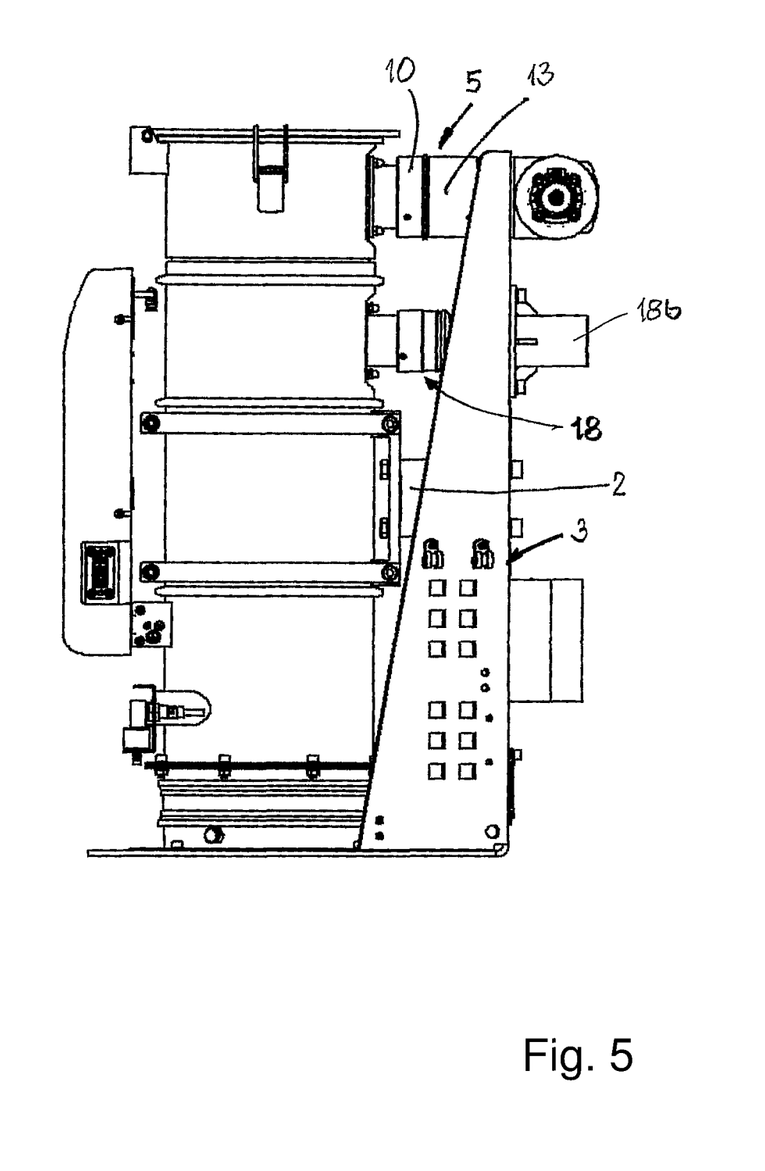
FIG. 5 is a side view of a second embodiment of a conveying device according to the invention.
Figure 6:
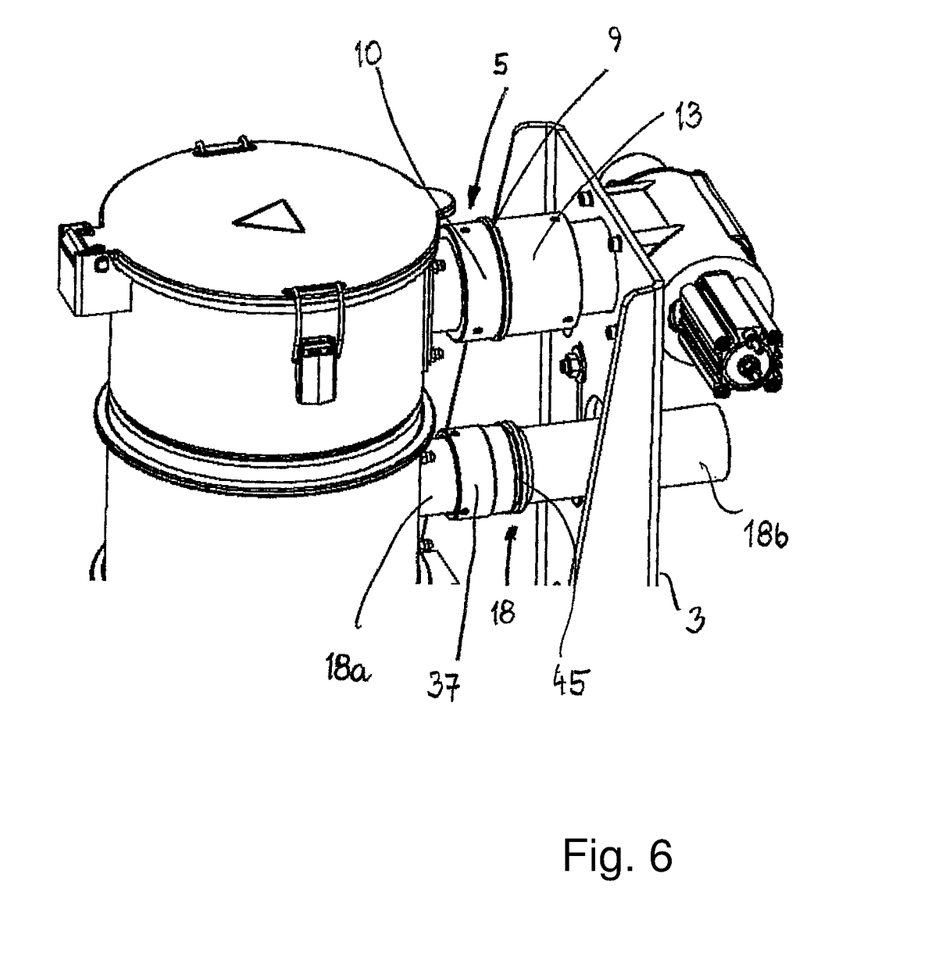
FIG. 6 shows in perspective and enlarged illustration a part of the conveying device according to FIG. 5.

The two tubular coupling connectors 18a, 18b are arranged such that, viewed in radial direction, they adjoin each other (FIGS. 3 and 4). The coupling connector 18a has an inner diameter that is larger than the outer diameter of the coupling connector 18b. In this way, an annular gap 20 is formed between the two coupling connectors 18a, 18b which are arranged along the same axis.

It is shown in an exemplary fashion in FIG. 4 that the inner diameter of the coupling connector 18a amounts to 60 mm and the outer diameter of the coupling connector 18b amounts to 50 mm. Therefore, the annular gap 20 has a width of 5 mm.

A bushing 21 is fastened to the coupling connector 18b and is sealed relative to the coupling connector 18b by at least one sealing ring 22, in the embodiment by two sealing rings 22 positioned one behind the other at an axial distance. One or two sealing rings 22 are seated in a respective annular groove 23 in the inner wall of the bushing 21.

A sealing element 24 is inserted into the bushing 21 in a position closely neighboring the coupling connector 18a and is embodied as a flat annular disk-shaped sealing ring. The bushing 21 is provided with an annular groove 25 which is provided in the exterior side of the bushing 21 and into which the sealing element 24 engages with its radial inner rim.

Like the sealing element 9, the sealing element 24 is comprised of a soft plastic material, preferably of EPDM, with a Shore A hardness of approximately 25 to 40. Advantageously, the sealing element 24 has a rectangular cross section (FIG. 3 and FIG. 4). The sealing element 24 projects radially past the coupling connector 18a.

The annular groove 25 is provided at an end section of the bushing 21 that has a reduced outer diameter. The sealing element 24 projects with most of its radial width from the annular groove 25 and is positioned, as long as no conveying of goods is taking place, at an axial distance opposite to a flat end face 26 of the coupling connector 18a (FIG. 4).

The coupling 18 can also be designed such that the coupling connector 18b projects into the coupling connector 18a.

Figure 2:
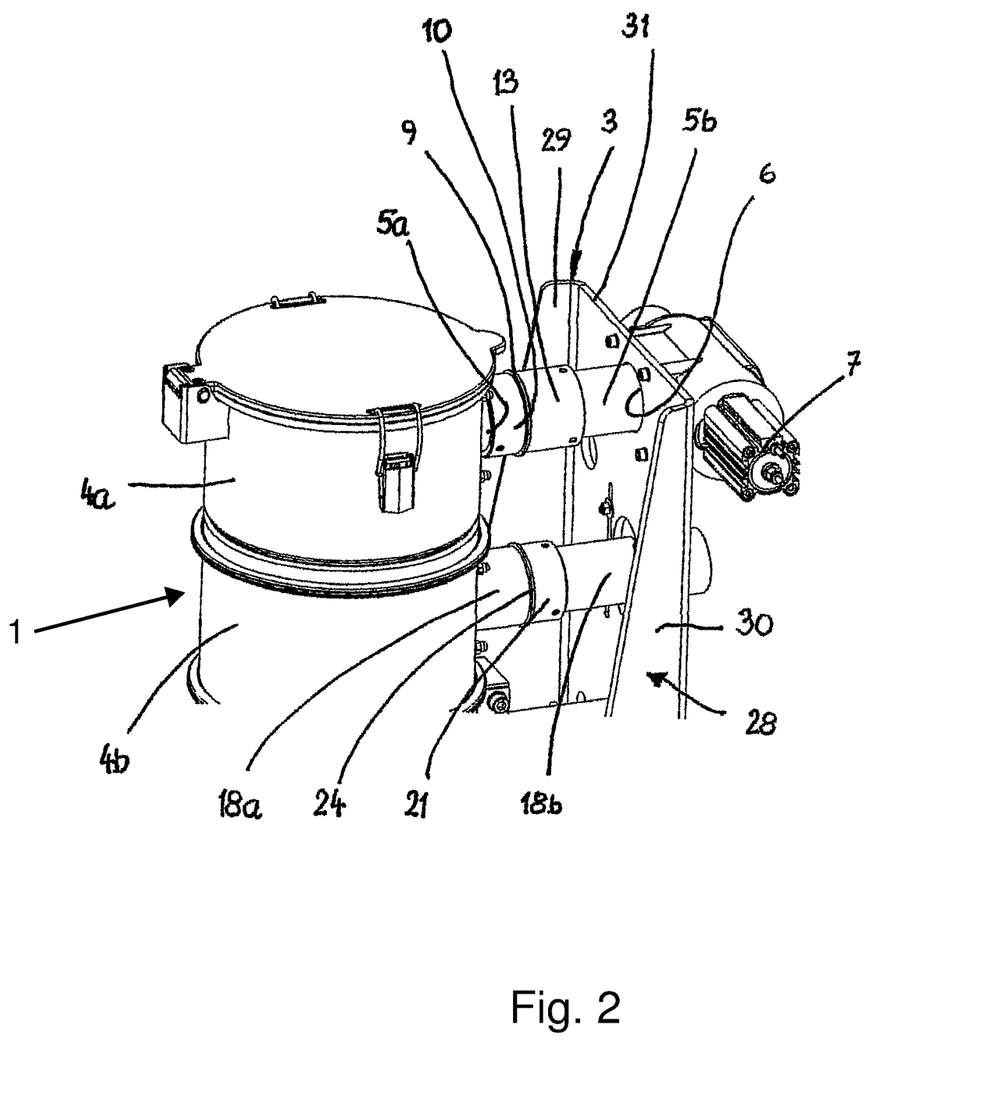
FIG. 2 shows in perspective and enlarged illustration a part of the conveying device according to the invention shown in FIG. 1.

The frame 3 is designed in the embodiment as a stand that comprises a bottom plate 27 with which the frame 3 is standing on a support surface. A U-shaped stand part 28 is projecting away from the bottom plate 27 and has sidewalls 29, 30 (FIG. 2) that project perpendicularly from a support part 31. Advantageously, the width of the sidewalls 29, 30 tapers in a direction away from the bottom plate 27, preferably at a steady rate.

The openings 6, 19 through which the coupling connectors 5b and 18b project are provided in the support part 31.

Advantageously, the coupling connectors 5a, 5b; 18a, 18b are positioned spaced apart at a distance above each other in the vertical direction of the frame 3.

Figure 1:
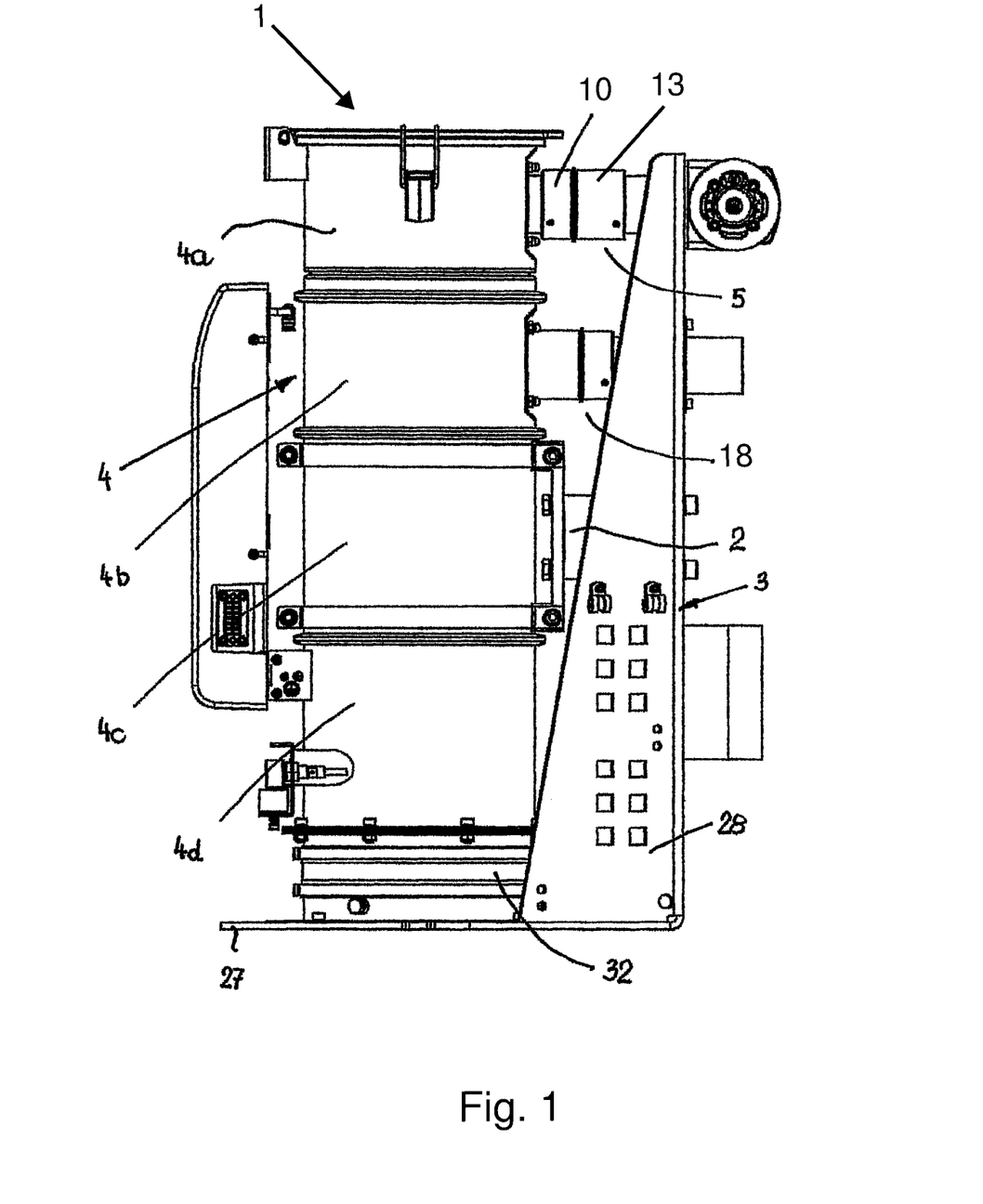
FIG. 1 is a side view of a conveying device according to the invention.

The weighing cell 2 is also fastened at the support part 31 in a known manner and is positioned at a distance below the two couplings 5, 18 (FIG. 1).

The separating unit 1 is suspended from the weighing cell 2 in a manner known in the art.

A collecting container (not illustrated) for the goods to be conveyed is accommodated in the separating unit 1. When a conveying process is started, the goods are transported from the storage container through the coupling 18 and reach the collecting container. When the appropriate quantity of goods has reached the collecting container, the weighing cell 2 emits a signal in order to open the bottom of the collecting container so that the goods can fall downwardly to an outlet 32 of the separating unit 1. From here, the goods are supplied, for example, to a processing machine (not illustrated), a container, or a drying hopper.

The two sealing elements 9, 24 do not seal the annular gaps 17, 20 as long as a conveying process does not take place. Therefore, the interior of the couplings 5, 18 is connected to the environment. The sealing elements 9, 24 are positioned in this initial position in a radial plane of the couplings 5, 18.

When a conveying process is started, a suction flow 33 is generated by the suction source connected to the connector of the vacuum valve 7 (FIG. 3) with which the goods are removed from the storage container and supplied in flow direction 34 to the coupling 18. Inside the separating unit 1, the separation of the suction air from the conveyed goods is carried out in a manner known in the art.

The two sealing elements 9, 24 are pulled during the conveying process against their respective flat sealing surface 16, 26. This is illustrated in FIG. 4 for the coupling 18 and the sealing element 24. In the same manner, the sealing element 9 of the coupling 5 is also seal-tightly pushed against the sealing surface 16. The annular gap 17, 20 is initially open so that, at the beginning of the conveying process, air is sucked in from the exterior through the annular gap 17, 20 into the coupling connector 5a, 18a due to the vacuum in the couplings. This is illustrated in FIG. 4 by the flow arrow 35. The force F is acting on the sealing element 24 so that the radially projecting part of the sealing elements 9, 24 is deformed elastically such that it contacts seal-tightly the sealing surface 13a, 26 that is positioned oppositely thereto at an axial spacing. This is illustrated in FIG. 4 in an exemplary fashion for the sealing element 24. Since the sealing elements 9, 24 are comprised of elastic sealing material, in particular of a soft plastic material, the sealing elements can be deformed very easily such that they reach their sealing position. The sealing elements 9, 24 project sufficiently far in radial direction out of the annular grooves 10a, 25 of the bushings 10, 21 so that the sealing elements 9, 24 fold elastically by a sudden movement into their sealing position.

As soon as the conveying process is terminated, the sealing elements 9, 24 automatically fold back by themselves into their position that opens the annular gap 17, 20.

Since the annular gaps 17, 20 at the beginning of the conveying process are open and for a brief period of time an air flow passes through the annular gaps 17, 20, granular material, dust, contaminants, and the like possibly present in the annular gap can be sucked away by this air flow. The couplings 5, 18 therefore exhibit a self-cleaning effect.

Both couplings 5, 18 are designed such that their coupling connectors 5b, 18b connected with the frame 3 have no contact with the coupling connectors 5a, 18a correlated with the separating unit 1.

In this way, in the state of rest no connection exists between the couplings 5, 18 of the separating unit 1 and the frame 3. This has the result that by means of the couplings 5, 18 no force is acting on the weighing cell 2 which could impair the weighing result.

In the region of the outlet 32, the separating unit 1 is only connected with a piece of cloth with the frame 3 so that in this region no forces are transmitted from the separating unit 1 to the weighing cell 2.

The conveying device according to FIGS. 5 to 8 is substantially of the same configuration as the preceding embodiment. Therefore, substantially only the differences to this embodiment are explained in the following.

The coupling 5 has the two bushings 10, 13 which are axially shorter than in the preceding embodiment and each comprise only one annular groove 12, 15 in which a sealing ring 11, 14 is seated, respectively.

As in the preceding embodiment, the two coupling connectors 5a, 5b are spaced apart at an axial distance from each other. The distance between the two coupling connectors 5a, 5b is covered by the bushing 13 which projects axially past the coupling connector 5b and engages across the coupling connector 5a at a radial spacing.

The two bushings 10, 13 are fastened in accordance with the preceding embodiment axially fixedly to the coupling connectors 5a, 5b, preferably by means of at least one countersunk screw 35, 36.

Between the two bushings 10, 13, the annular sealing element 9 is located which is designed as an annular disk and, as in the preceding embodiment, advantageously has a rectangular cross section.

The sealing element 9 can be arranged in accordance with the preceding embodiment in an external annular groove of the bushing 10.

Figure 7:
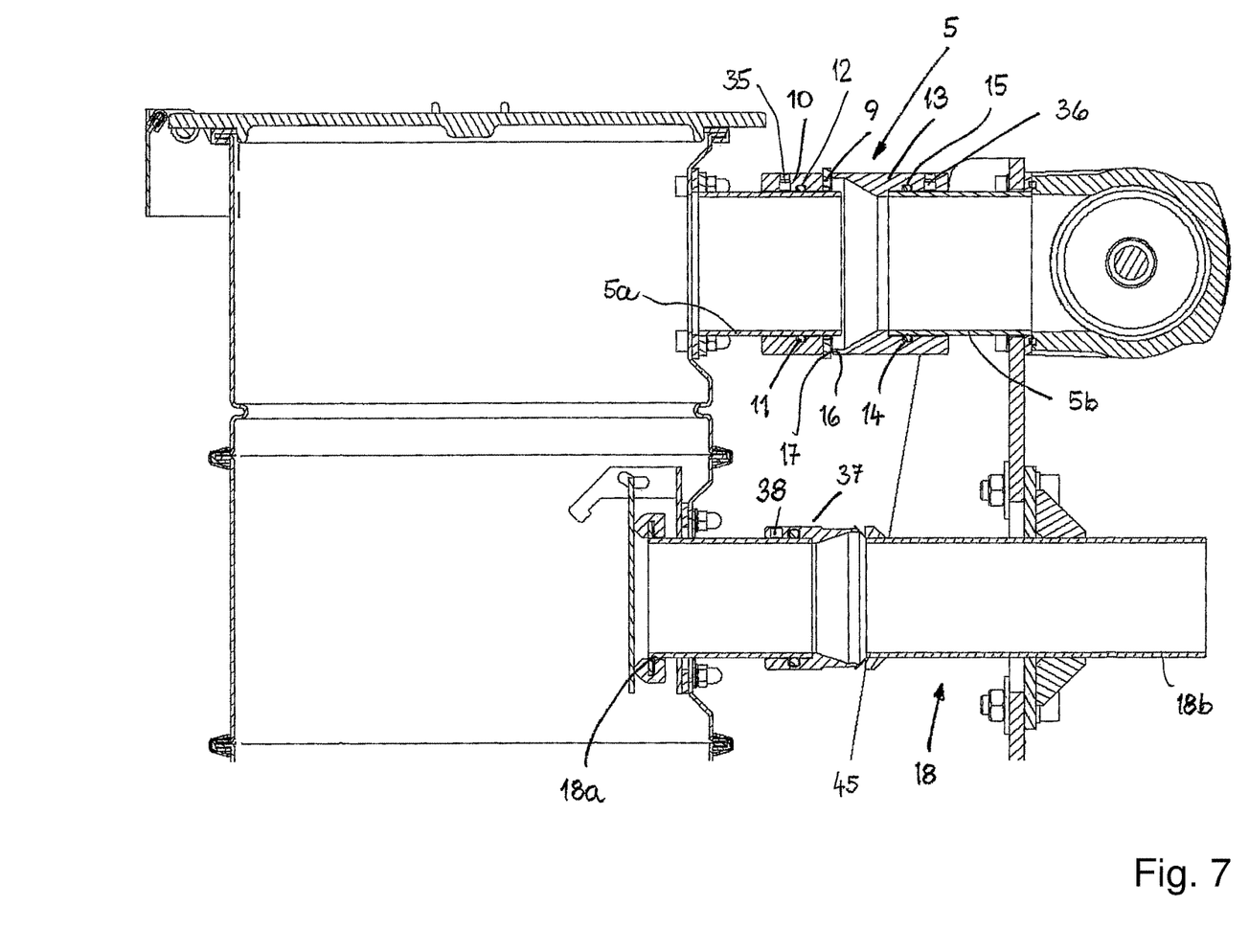
FIG. 7 shows in enlarged illustration and in section two couplings arranged above each other by means of which a suction unit as well as a storage container for goods to be conveyed can be connected.

However, it is also possible, as illustrated in FIG. 7, that the sealing element is loosely arranged between the two bushings 10, 13 on the coupling connector 5a. It is only necessary to take care that the sealing element 9, as long as no conveying action is taking place, is spaced apart at a distance from the end face 16 of the bushing 13. In this way, the annular gap 17 between the sealing element 9 and the end face 16 of the bushing 13 is open as long as no conveying process is taking place.

The sealing element 9 is positioned in the initial position in a radial plane of the coupling 5 or of the coupling connector 5a.

As soon as a conveying process is started, the sealing element 9 is pulled in the described manner against the flat sealing surface 16 of the bushing 13 so that the annular gap 17 is closed and the interior of the coupling 5 is separated from the environment.

The coupling 18 comprises the two coupling connectors 18a and 18b. In contrast to the preceding embodiment, the two coupling connectors 18a, 18b that are spaced apart at an axial distance relative to each other have the same inner diameter, advantageously also the same outer diameter.

A bushing 37 is seated axially fixed on the coupling connector 18a and is advantageously held with at least one countersunk screw 38 on the coupling connector 18a.

The coupling connector 18a projects with its end section into the bushing 37 and is resting areally against its inner wall. In order to be able to position the bushing 37 in a simple way in axial direction, the bushing 37 at its inner wall is provided with a radially inwardly projecting, circumferentially extending annular projection 39 (FIG. 8) at which the end face of the coupling connector 18a comes to rest and thereby secures the axial position of the bushing 37 in a simple way.

The bushing 37 is provided at its inner wall with at least one annular groove 40 (FIG. 8) in which a sealing ring 41 is accommodated which is contacting seal-tightly the outer wall of the coupling connector 18a. Depending on the length of the bushing 37, additional sealing rings and annular grooves can be provided also.

The bushing 37 projects axially past the coupling connector 18a in the direction of the coupling connector 18b. In the axially projecting region, the bushing 37 has a conical inner wall 42 which widens, beginning approximately at the free end of the coupling connector 18a, in a direction away from the coupling connector 18a. Near the free end of the bushing 37, the conical inner wall 47 passes into a cylindrical inner wall 43. The diameter of the cylindrical inner wall 43 is larger than the outer diameter of the coupling connector 18b.

In order to ensure an interruption-free passage of the goods to be conveyed through the coupling 18, the annular projection 39 of the bushing 37 has an inner diameter that corresponds to the inner diameter of the coupling connector 18a. In this way, at the transition from the annular projection 39 to the coupling connector 18a there is no step where goods particles might get caught.

The bushing 37 has an end face 44 which is spaced apart at an axial distance from the coupling section 18b; a sealing element 45 is contacting seal-tightly the end face 44. The sealing element 45 is a thin conical disk which is provided at a securing ring 46 that is held on the coupling connector 18b. The securing ring 46 can be axially fixed in a suitable manner on the coupling connector 18b.

Figure 8:
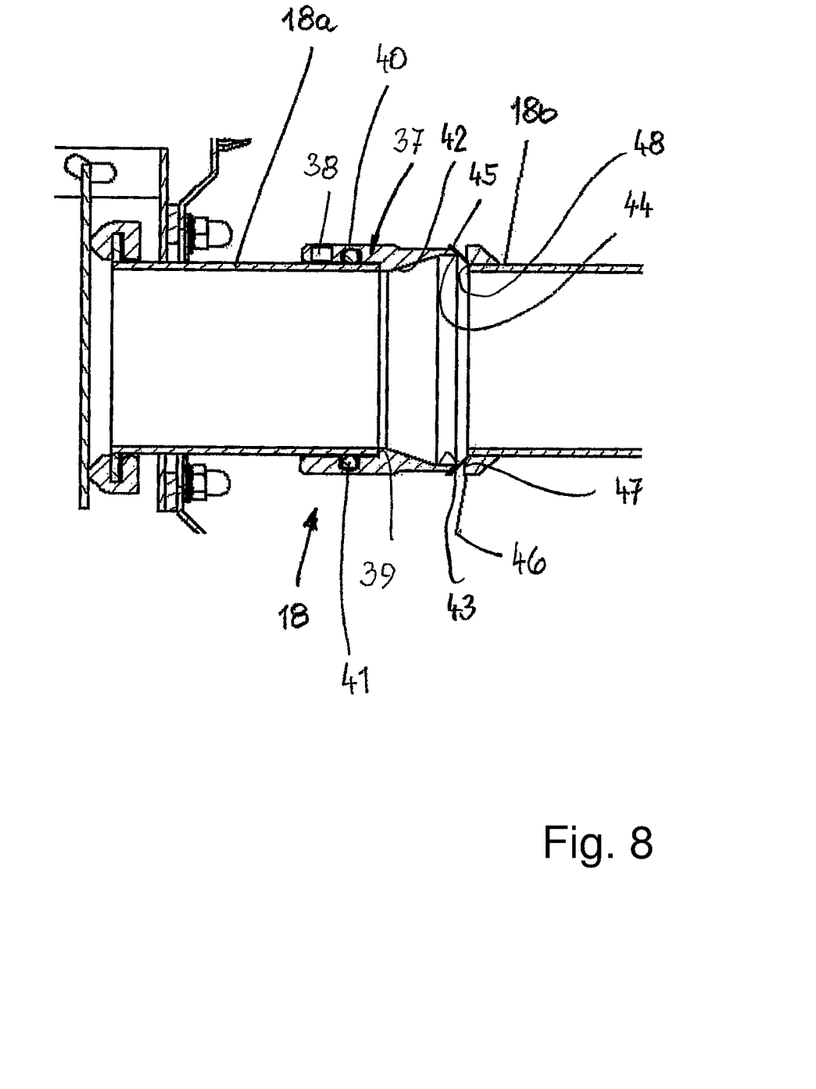
FIG. 8 shows in enlarged illustration and in section the coupling provided for connecting the storage container of the conveying device according to the invention shown in FIG. 5.

As shown in FIG. 8, the securing ring 46 advantageously projects slightly past the coupling connector 18b. Advantageously, the securing ring 46 is embodied as one piece together with the sealing element 45 that, like the sealing element 24 of the preceding embodiment, is comprised of a soft plastic material, preferably EPDM, and has a Shore A hardness of only approximately 25 to 40, for example.

The sealing element 45 is configured such that it widens in the direction toward the bushing 37.

The securing ring 46 has a flat end face 47 which is positioned in a radial plane of the coupling connector 18b and advantageously is positioned slightly in front of the end face of the coupling connector 18b. The sealing element 45 extends away from the inner rim 48 of the securing ring 46. The sealing element 45 or the securing ring 46 are provided on the coupling connector 18b in such a way that the sealing element 45 near its outer rim which is facing the coupling connector 18a is contacting the end face 44 of the bushing 37 with minimal contact pressure. Since the sealing element 45 is of a very soft material and is contacting the bushing 37 only with minimal contact pressure, the contact of the sealing element 45 at the bushing 37 practically does not affect the weighing result of the weighing cell 2.

In contrast to the preceding embodiment, the coupling 18 is not provided with an annular gap but the sealing element 45 seals the interior of the coupling 18 always air-tightly relative to the environment.

As long as no conveying process is carried out, the sealing element 9 of the coupling 5 is in the open position so that through the annular gap 17 the interior of the coupling 5 is connected to the environment. In contrast to the preceding embodiment, the sealing element 45 seals the coupling 18 even when no conveying action is performed.

In order to start a conveying process, the suction source connected to the connector of the vacuum valve 7 generates the suction flow 33 (FIG. 3) by means of which the goods are removed from the storage container and supplied in flow direction 34 to the coupling 18. In the separating unit 1, the suction air is separated from the conveyed goods.

Due to the vacuum in the coupling 5, the air is sucked in from the exterior through the annular gap 17 into the coupling 5. Due to the force F (FIG. 4) acting on the sealing element 9, the sealing element 9 is elastically deformed and contacts seal-tightly the sealing surface 16 of the bushing 10. Since the annular gap 17 is open at the beginning of the conveying process and an air flow is flowing briefly through the annular gap 17, goods particles that are possibly present in this annular gap are sucked away by the air flow. As in the preceding embodiment, the coupling 5 therefore exhibits a self-cleaning effect.

The specification incorporates by reference the entire disclosure of German priority document 10 2019 007 134.4 having a filing date of Oct. 11, 2019 and of German priority document 10 2020 004 386.0 having a filing date of Jul. 17, 2020.

While specific embodiments of the invention have been shown and described in detail to illustrate the inventive principles, it will be understood that the invention may be embodied otherwise without departing from such principles.

What is claimed is:

1. A conveying device for use in the field of plastics, the conveying device comprising:
    a frame;
    a weighing cell connected to the frame;
    a separating unit suspended from the weighing cell;
    a first coupling connected to the frame and configured to connect a vacuum source to the separating unit;
    a second coupling connected to the frame and configured to connect a conveying line for goods to be conveyed to the separating unit;
    wherein at least one of the first coupling and the second coupling comprises a first coupling part connected to the separating unit and a second coupling part connected to the frame, wherein the first and the second coupling parts do not contact each other in a region of no contact;
    at least one sealing element configured to seal the region of no contact between the first and the second coupling parts.

2. The conveying device according to claim 1 wherein the first and the second coupling parts are cylindrical pipe pieces.

3. The conveying device according to claim 1, wherein the first and the second coupling parts are aligned with each other.

4. The conveying device according to claim 1, wherein the first and the second coupling parts are axially spaced apart at a distance and wherein the distance is bridged by a bushing provided on at least one of the first and second coupling parts.

5. The conveying device according to claim 1, wherein the at least one sealing element is a flat sealing ring.

6. The conveying device according to claim 1, wherein the at least one sealing element is comprised of a soft material.

7. The conveying device according to claim 6, wherein the at least one sealing element is comprised of a soft plastic material with a Shore A hardness of approximately 25 to 40.

8. The conveying device according to claim 6, wherein the at least one sealing element is comprised of EPDM (ethylene propylene diene monomer rubber) with a Shore A hardness of approximately 25 to 40.

9. A conveying device for use in the field of plastics, the conveying device comprising:
    a frame;
    a weighing cell connected to the frame;
    a separating unit suspended from the weighing cell;
    a first coupling connected to the frame and configured to connect a vacuum source to the separating unit;
    a second coupling connected to the frame and configured to connect a conveying line for goods to be conveyed to the separating unit;
    wherein at least one of the first coupling and the second coupling comprises a first coupling part connected to the separating unit and a second coupling part connected to the frame, wherein the first and the second coupling parts do not contact each other in a region of no contact;
    at least one sealing element configured to seal the region of no contact between the first and the second coupling parts;
    wherein the at least one sealing element comprises a radial inner rim and the radial inner rim engages an annular groove provided at the first coupling part or at the second coupling part.

10. The conveying device according to claim 9, wherein the at least one sealing element comprises a radial width and projects with more than half of the radial width from the annular groove.

11. A conveying device for use in the field of plastics, the conveying device comprising:
    a frame;
    a weighing cell connected to the frame;
    a separating unit suspended from the weighing cell;
    a first coupling connected to the frame and configured to connect a vacuum source to the separating unit;
    a second coupling connected to the frame and configured to connect a conveying line for goods to be conveyed to the separating unit;
    wherein at least one of the first coupling and the second coupling comprises a first coupling part connected to the separating unit and a second coupling part connected to the frame, wherein the first and the second coupling parts do not contact each other in a region of no contact;
    at least one sealing element configured to seal the region of no contact between the first and the second coupling parts;
    wherein the first and the second coupling parts are axially spaced apart at a distance and wherein the distance is bridged by a bushing provided on at least one of the first and second coupling parts, wherein the at least one sealing element comprises a radial inner rim and the radial inner rim engages an annular groove provided at an outer side of the bushing.

12. The conveying device according to claim 11, wherein the at least one sealing element comprises a radial width and projects with more than half of the radial width from the annular groove.

13. A conveying device for use in the field of plastics, the conveying device comprising:
- a frame;
- a weighing cell connected to the frame;
- a separating unit suspended from the weighing cell;
- a first coupling connected to the frame and configured to connect a vacuum source to the separating unit;
- a second coupling connected to the frame and configured to connect a conveying line for goods to be conveyed to the separating unit;
- wherein at least one of the first coupling and the second coupling comprises a first coupling part connected to the separating unit and a second coupling part connected to the frame, wherein the first and the second coupling parts do not contact each other in a region of no contact;
- at least one sealing element configured to seal the region of no contact between the first and the second coupling parts;
- wherein the at least one sealing element is positioned in a radial plane of the first coupling part or of the second coupling part.

14. A conveying device for use in the field of plastics, the conveying device comprising:
- a frame;
- a weighing cell connected to the frame;
- a separating unit suspended from the weighing cell;
- a first coupling connected to the frame and configured to connect a vacuum source to the separating unit;
- a second coupling connected to the frame and configured to connect a conveying line for goods to be conveyed to the separating unit;
- wherein at least one of the first coupling and the second coupling comprises a first coupling part connected to the separating unit and a second coupling part connected to the frame, wherein the first and the second coupling parts do not contact each other in a region of no contact;
- at least one sealing element configured to seal the region of no contact between the first and the second coupling parts;
- wherein the at least one sealing element comprises a release or rest position and is spaced apart in the release or rest position at a distance from a sealing surface.

15. The conveying device according to claim 14, wherein the at least one sealing element comprises a sealing position, wherein the at least one sealing element interacts with the sealing surface to seal-tightly seal in the sealing position the region of no contact between the first and the second coupling parts.

16. The conveying device according to claim 15, wherein the at least one sealing element is moved from the release or rest position into the sealing position when a conveying process is carried out.

17. The conveying device according to claim 1, wherein the at least one sealing element is a conical disk-shaped ring.

18. The conveying device according to claim 16, further comprising:
- a bushing seated on one of the first and the second coupling parts and axially projecting past said coupling part, wherein the bushing comprises a sealing surface;
- a securing ring seated on the other one of the first and the second coupling parts, wherein the conical disk-shaped ring is disposed on the securing ring and contacts seal-tightly the sealing surface of the bushing.

* * * * *